United States Patent [19]
Bicskei

[11] 4,077,722
[45] Mar. 7, 1978

[54] PRECISION BLOCKING OF LENS BLANKS

[76] Inventor: Bela Joseph Bicskei, 7 Hemenway Rd., Framingham, Mass. 01701

[21] Appl. No.: 657,455

[22] Filed: Feb. 12, 1976

[51] Int. Cl.² .............................................. G01B 9/00
[52] U.S. Cl. .................................... 356/127; 350/247; 33/174 A
[58] Field of Search ................ 356/127; 350/178, 245, 350/247, 252, 320; 51/277; 33/174 A

[56] References Cited
U.S. PATENT DOCUMENTS

| 1,542,112 | 6/1925 | Tillyer | 356/127 |
| 3,049,766 | 8/1962 | Buckminster | 33/174 A |

Primary Examiner—Conrad J. Clark
Attorney, Agent, or Firm—George E. Kersey

[57] ABSTRACT

Method and apparatus for the precision blocking of lens blanks using a holder to de-center the blank and fix its optical axis. The holder is then used to position the blank with respect to a blocker by which an alloy hub or "block" is removably affixed to the blank so that it can be properly gripped for conversion into a finished lens product.

10 Claims, 5 Drawing Figures

PRECISION BLOCKING OF LENS BLANKS

BACKGROUND OF THE INVENTION

This invention relates to the blocking of lens blanks, and more particularly to the precision attachment of blocks to lens blanks for their conversion into finished lenses.

In the finishing of lens blanks for eye glasses, it is necessary to translate a prescription provided by an oculist or optometrist into lenses which are suitable and appropriate for mounting into a frame that meets the physical requirements of the user.

The prescription specifies the various powers of the users lenses, and their optical axes, along with the users pupilary distance (P.D.) and the measurements of the frame that has been selected. A pupilary distance is the measure of the separation between the pupils of the user. It is apparent that the pupilary distance varies from one user to another, and that it must be coordinated with the measurements of the selected frame.

In translating a lens prescription into a finished product, an optical technician begins by selecting a lens blank in accordance with the user's optical correction. In the general case where the lens has a toric, i.e. toroidal, outer surface and a spherical inner surface, the lens has an optical center and prescribed optical axis in accordance with the required cylindrication of the lens. In the special case where the lens has only spherical surfaces, it has only an optical center.

The optical center and axis of a lens blank are located using an instrument known as a lensometer. The blank is positioned in the viewer of the lensometer and a reticle is focused on it. A typical lensometer reticle has a triplet of parallel lines and an orthogonal bisecting line. When the bisecting line is focused on the lens blank, its spherical power is indicated by the focusing control. The lens blank is then centered horizontally.

In the next step, the triplet is focused on the lens and the focusing control provides an indication of the cylindrical power (which is given by the difference between the indicated value and the spherical reading). The lens blank is then centered vertically.

In the final step, the reticle is rotated until the bisector appears as a solid, unfragmented line. The amount of rotation indicates the inclination of the optical axis and the intersection of the bisector and the central line of the triplet gives the optical center.

The optical center and two points on the optical axis are then marked using an inking lever mechanism appended to the lensometer.

Once marked the lens blank is removed from the lensometer and a "cutting" line drawn on it through the three points to indicate the optical axis. In the next step a special scale is placed along the optical axis to locate the "finishing center". The latter is at the position by which the optical center is de-centered to accommodate the lens to the frame of the user. Thus if the P.D. is 68 millimeters and the frames have a bridge size, nose span, of 14 millimeters and a lens size of 48 millimeters making a total frame span of 62 millimeters, the optical center of each lens blank must be de-positioned by three millimeters (one-half of the difference between the frame span and the P.D.)

A temporary mounting known as a "block" is then temporarily affixed to the lens at the finishing center. The block is in the form of an alloy with a pattern that allows the lens blank to be rotated with respect to a finishing wheel.

It is apparent that if the optical axis is not properly located, or if the finishing center is not properly located, the finished lens will be in error.

In addition, the manual techniques in present use require operators with considerable skill, and are time consuming.

Even if the operator is highly skilled, he is confronted wit play and inexactness in the instruments that he uses.

The result is that an estimated 30 percent of the lenses are incorrectly blocked, of which about fifteen percent are so inaccurate that they must be discarded. While the remaining fifteen percent are not rejected, they are nonetheless less accurate than they should be.

Accordingly, it is an object of the invention to increase the precision with which lens blanks can be blocked. A related object is to eliminate the need for the marking of lens blanks. Another related object is to eliminate the need for special scales in the de-centering of lens blanks.

Another object is to reduce the number of rejects encountered in the blocking of lenses. A related object is to raise the level of accuracy of lens blanks that are accepted.

A further object is achieve the precision blocking lenses with only semi-skilled operators.

SUMMARY OF THE INVENTION

In accomplishing the foregoing and related objects, the invention provides a holder by which a lens blank can be adjusted with precision relative to a lensometer and then to a blocker.

The holder has two degrees of translational motion and one degree of rotation. This permits accurate location of the optical center and axis of the blank. The holder can then be zeroed and the lens de-positioned in either or both of the translational directions to locate a finishing center for pupilary distance and bifocal adjustment.

The accuracy of the finishing center located using the holder is maintained by transferring the holder, with the blank, to a blocker. This eliminates any need for marking of the blanks, and the need for using auxiliary scales to de-center the blank.

As a result the required skill of the operator is significantly reduced and the quality of the final, finished product is considerably increased.

In accordance with one aspect of the invention, the holder is formed by frames which are nested within one another and slidable relative to one another.

In accordance with another aspect of the invention the holder has graduated scales for each degree of translation for controlled depositioning of the lens blank.

DESCRIPTION OF THE DRAWINGS

Other aspects of the invention will become apparent after considering several illustrative embodiments taken in conjunction with the drawings in which.

DETAILED DESCRIPTION

Figures 1A, 1B:
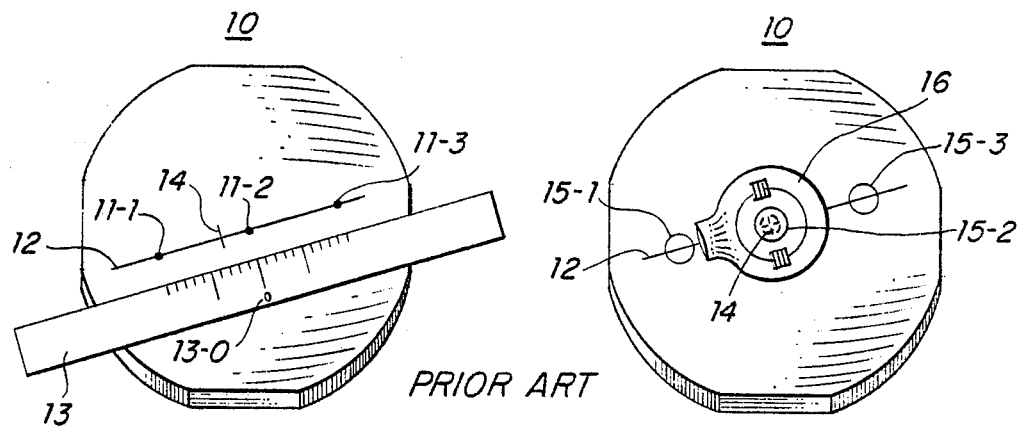
FIGS. 1A and 1B are diagrams of a lens blank being processed in accordance with the prior art.

Turning to the drawings, FIG. 1A shows an illustrative lens blank 10 as it appears during the second stage of blocking in accordance with the prior art.

During the first stage, the blank 10 was positioned on a lensometer (not shown) and marked (temporarily) with three dots, 11-1, 11-2 and 11-3. The central dot 11-2 is at the optical center of the blank 10, while the adjoining dots 11-1 and 11-3 are points on the cutting line.

After the dots 11-1, 11-2, and 11-3 are formed on the blank, it is removed from the lensometer and the optical axis 12 is drawn on the blank through the dots, using, for example, a felt tip pen. When this is done, the blank 10 is ready for decentering in accordance with the prior art. This is accomplished by positioning a graduated scale 13 on the blank 10 along the axial line 12, with the origin 13-0 of the scale 13 at the optical center indicated by the dot 11-2. The blank is then de-centered according to the difference between the F.D. (frame distance) and the P.D. (pupilary distance). For the particular example of FIG. 1A the blank is decentered by about 3 millimeters and the F.C. (frame center) indicated by the mark 14.

The scale is then removed and the blank 10 placed on a blocker (not shown), with the F.D. mark 14 overlying the corresponding indicator 15-2 on the blocker and the axis 12 overlying axial indicators 15-1 and 15-3 on the blocker. The blocker is then operated to form an alloy hub 16 that is centered on the F.D. mark 14.

Once the hub 16 is formed, it is used to secure the blank 10 in the grinding machine (not shown) by which the blank is ground into the desired finished product for proper mounting in the frame (not shown) of the user.

The hub or block 16 is formed in standard fashion of alloy that tends to adhere to the glass surface or ordinary lens blanks. The adhesive is enhanced by lightly spraying the blank with a standard adhesive substance. Once the grinding operation is completed, the block 16 is removed, for example by lightly tapping the lens.

It is apparent that the prior art blocking as typified by FIG. 1A and 1B is slow, cumbersome and inaccurate.

Figure 2:
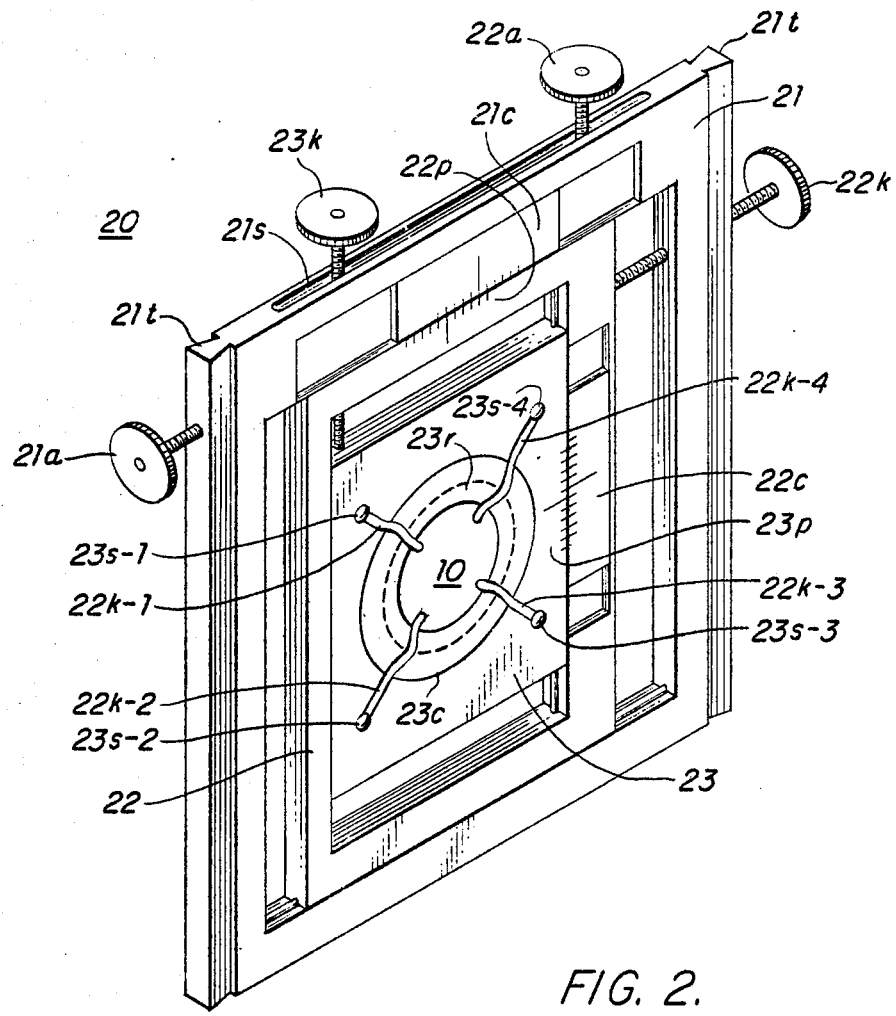
FIG. 2 is a perspective view of a holder in accordance with the invention.

The invention overcomes the difficulties of the prior art by using a holder 20 of the kind pictured in FIG. 2.

The holder 20 is formed by an outer frame 21, an intermediate frame 22 and an inner frame 23.

The inner frame 23 is movable vertically within the intermediate frame 22 by an adjusting knob 23k which is treaded through the intermediate frame 22 and extends through a slot 21s in the outer frame 21.

In addition the inner frame 23 has a central member 23c which is rotatable within the frame 23 and holds the lens blank 10. A retainer 23r, which can be a rubber ring, secures the blank 10 and provides an appropriate gripping surface for rotating the member 23c. After a suitable rotation has taken place, as explained below, the blank 10 is securely held in place by tightening set screws 23s-1 through 23s-4 associated with clamps 23k-1 through 23k-4.

The rotor member 23c is removable from the inner frame 23 and replacable with other rotor members to hold different sizes of lens blanks. In current practice the largest lens blanks have a maximum dimension of 75 millimeters and the smallest blanks have a maximum dimension of 58 millimeters.

The intermediate frame 22 is movable horizontally within the outer frame 21 by an adjusting knob 22k which is treaded through the outer frame 21.

The outer frame 21 includes an adjustable scale 21c which can be accurately positioned with respect to a scale 22p on the intermediate frame 22 by an adjusting knob 21a.

A similar adjustable scale 22c can be positioned with respect to a scale 23p on the inner frame 23, by an adjusting knob 22a which extends through the slot 21s in the outer frame 21.

To maintain the relative displacements of the frames 21 through 23 relative to one another, a dovetail groove and tonque can be used as shown. A dovetail tongue 21t is also provided at the vertical edges of the outer frame 22 for positioning the holder in a mount as explained below.

Figure 3:
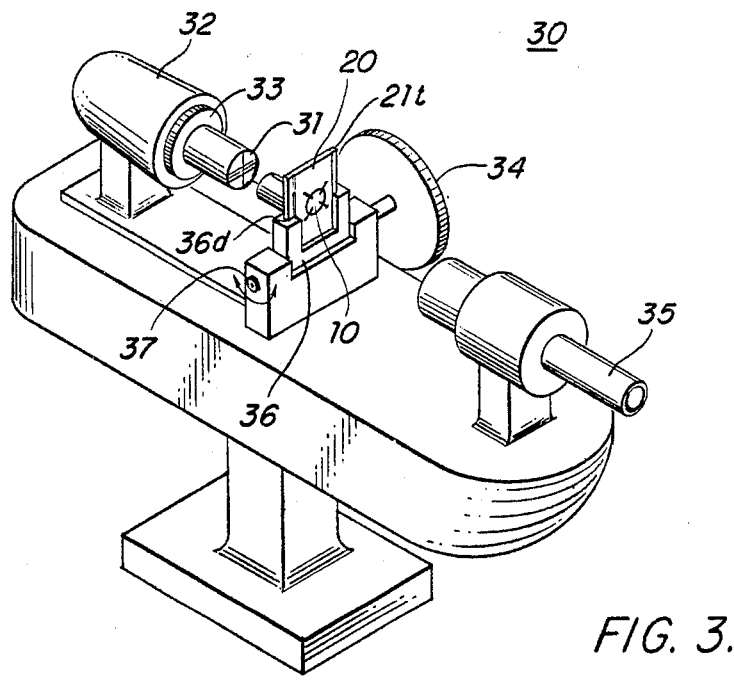
FIG. 3 is a perspective view of a lensometer with the holder of FIG. 2 in position.

In use, the holder 20 of FIG. 2 is inserted into a modified lensometer 30 of the kind illustrated in FIG. 3. The lensometer 30 has a standard reticle 31, a source of illumination 32 for the riticle and axial adjustment control 33, as well as a power adjustment control 34 and a view 35.

The lensometer 30 is modified by having a special mount 36 for the holder 20, with a dovetail slot 36d for the dovetail tongue 21t. In addition the mount is pivotable about an axis 37 to permit the lens blank 10 within the holder 20 to be seated against a reticle lens (not visible in FIG. 3), despite the fact that some of the lens blanks used in the holder 20 have appreciable curvature.

Once the lens blank 10 in the holder 20 is seated against the reticle lens of the lensometer 30, the control 34 is set with the spherical power of the lens blank. The adjusting knob 22k (FIG. 2) is manipulated until the verticle line of the reticle is in focus, so that it passes through the optical center of the lens blank.

The control 34 is next set with the cylindrical power of the lens blank and the adjusting knob 23k manipulated until the triplet of the reticle is in focus. The optical center of the lens blank is then at the intersection of the verticle line and the middle line of the triplet.

In the next step the control 33 is set with the optical axis and the central member 23c rotated until the vertical line from the reticle is unfragmented.

The set screws 23s-1 through 23s-4 are secured (to prevent any further, inadvertent rotation) and the scales 21c and 22c are zeroed. Zeroing takes place by operating adjusting knob 21a until the center line of scale 21c is opposite the center line of scale 22p. Similarly, adjusting know 22a is operated until the center line of scale 22c is opposite the center line of scale 23p. Zeroing may take place with the holder in or out of the mount 36.

As a result of the foregoing operations the optical center of the lens blank 10 is precisely determined with respect to the holder 20. This is by contrast with the manual manipulation of the lens blank required in the prior art. It will be understood that the particular sequence of operations is merely illustrative, and other sequences may be employed as well.

In the first step of achieving precision blocking in accordance with the invention, the lens blank 10 in the holder 20 is de-positioned to the proper finishing center and the proper bifocal center.

If the lens blank 10 is not to be bifocal, it is only necessary to de-center the established optical center by moving the inner frame 23 from side to side using the knob 22k. Since the movable scale 21c is zeroed at this point with respect to the fixed scale 22p, the de-centering is accomplished by operating the knob 22k until the desired difference appears between the two scales 21c and 22p.

A similar de-positioning occurs between the zeroed scales 22c and 23p where a bifocal correction is to be made.

Figure 4:
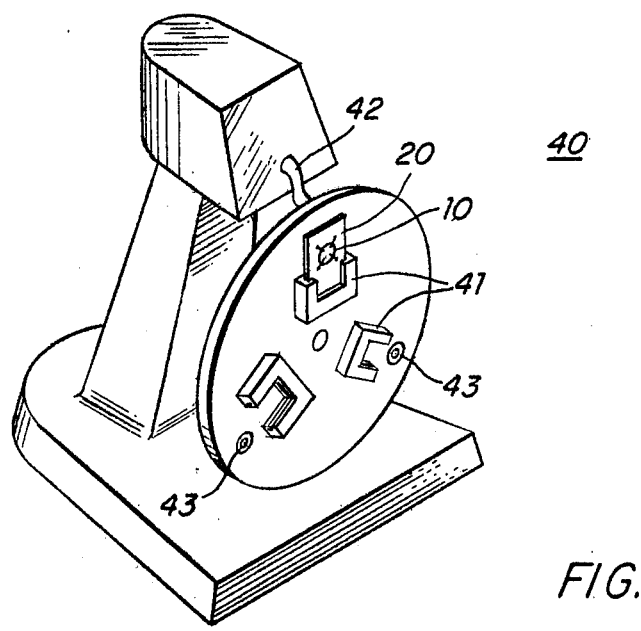
FIG. 4 is a perspective view of a blocker with the holder of FIG. 2 in position.

After the blank 10 is suitably de-positioned relative to the holder 20, it is inserted into a mount 41 of the modified blocker 40 shown in FIG. 4.

The mount 41 is similar to the mount 36 of the modified lensometer. Since the mount 41 assures that the lens blank 10 will be properly positioned, it is only necessary to operate the blocker in standard fashion, permitting molten alloy to flow along a feed tube 42 to a die position 43, where the desired block or hub is formed, similar to the block 16 of FIG. 1, except that it is formed with precision and without resort to the inaccurate manual techniques of the prior art.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. The method of calibrating a lens member which comprises the steps of:

a. inserting a lens blank into a first portion of a holder which is adjustable with respect to a second portion thereof;
   b. adjusting the first portion of the holder relative to the second portion thereof in order to align the lens in accordance with a prescribed optical criterion; and
   c. de-positioning the lens blank thus adjusted by a prescribed amount by moving said first portion relative to said second portion.

2. The method of claim 1 wherein a temporary hub is formed on the lens blank after it has been de-positioned.

3. The method of claim 2 wherein said hub is formed using a blocker.

4. The method of claim 1 wherein said lens member is rotatable with respect to said first portion holder.

5. The method of claim 1 wherein said first portion of a holder is translatable with respect to said second portion of a holder.

6. The method of claim 1 wherein said first and second portions of a holder have at least one adjustable scale.

7. The method of claim 6 wherein said scale is zeroed after the adjusting step and controllably moved from its zeroed position in the depositioning step.

8. The method of claim 1 wherein the optical criterion is satisfied when the holder is adjusted to locate the optical center of said lens blank.

9. The method of claim 1 wherein the optical criterion is satisfied when the holder is adjusted to locate the optical axis of said lens blank.

10. The method of claim 1 wherein the optical criterion is satisfied by using a lensometer.

* * * * *